United States Patent [19]

Okuno et al.

[11] 3,996,594
[45] Dec. 7, 1976

[54] LIGHT MEASURING APPARATUS FOR A SINGLE LENS REFLEX CAMERA

[75] Inventors: Youichi Okuno, Yokohama; Takehiko Kiyohara, Zama; Tokuichi Tsunekawa, Yokohama; Teiji Hashimoto, Kawasaki, all of Japan

[73] Assignee: Canon Kabushiki Kaisha, Tokyo, Japan

[22] Filed: Oct. 14, 1975

[21] Appl. No.: 621,762

[30] Foreign Application Priority Data

Oct. 15, 1974   Japan ............................ 49-124423

[52] U.S. Cl. .................................. 354/56; 354/59; 354/152; 356/219
[51] Int. Cl.² ....................... G03B 7/00; G01J 1/00
[58] Field of Search ............. 354/59, 31, 23 R, 56, 354/155, 152, 54; 356/219, 224, 225

[56] References Cited

UNITED STATES PATENTS

| | | | |
|---|---|---|---|
| 3,478,663 | 11/1969 | Tsuruoka et al. | 354/56 |
| 3,532,043 | 10/1970 | Shimomura et al. | 354/54 |
| 3,612,703 | 10/1971 | Irisawa et al. | 356/219 |

FOREIGN PATENTS OR APPLICATIONS 1,772,708   3/1971   Germany

Primary Examiner—Joseph W. Hartary
Attorney, Agent, or Firm—Toren, McGeady and Stanger

[57]  ABSTRACT

An object image is formed on a screen by an objective lens. The light beam from the object image formed on the screen is guided in a direction to an eye piece by a pentagonal roof prism. Only one light measuring means is provided facing an upper part of the exit face of the pentagonal roof prism. Therefore, the light beam from the screen passing through the upper part of the pentagonal roof prism impinges into the light measuring means. Also the light beam from the screen passing through both left and right end parts of the exit face of the pentagonal roof prism is directed onto the light-measuring means through a reflective plane. A shutter means is provided at least for one of the luminous flux from the upper part of the pentagonal roof prism and the luminous flux from the both left and right end parts. The light measurement distribution in an object scene may be varied by the shutter means.

2 Claims, 3 Drawing Figures

LIGHT MEASURING APPARATUS FOR A SINGLE LENS REFLEX CAMERA

BACKGROUND OF THE INVENTION

The present invention relates to a light measuring apparatus of a single lens reflex camera in which the light measurement distribution in an object scene may be varied.

Such light measuring apparatus has been known that only one light receiving means is provided at an upper part of exit face of a pentagonal roof prism and the light beam penetrating through the upper part of the exit face and one penetrating through the both left and right end parts of the exit face are measured by the light receiving means.

For example, the specification of German Patent Publication No. 1,772,708 published Mar. 25,1971 shows such an apparatus that only one light receiving means is provided facing an upper part of an exit face of a pentagonal prism to measure the light beam passing through the upper part of the exit face by the light receiving means, at the same time, the light beam passing through the both left and right end parts of the exit face is measured by guiding the light beam passing through the both left and right end parts of the exit face to a reflective plane.

SUMMARY OF THE INVENTION

An apparatus of the present invention is characterized by making the light measurement distribution in an object scene variable in such light measuring apparatus as mentioned above. The light beam penetrating through the upper part of the exit face of a pentagonal prism in such an apparatus and proceeding toward a light receiving means is the one from wide zone of a focusing screen, while the light beam penetrating through the left and right exit faces of a pentagonal prism and proceeding toward a light receiving means is the light beam passing through such aperture as determined by the size of a reflective plane, thus it is the light beam from a narrow zone of a focusing screen. Therefore, when both of the light beams are measured it is center-preference mean light measuring, and when the light beam penetrating through the upper part of the exit face of the pentagonal prism only is measured it is a mean light measuring, while when the light beam penetrating through the left and right end parts of the exit face of the pentagonal prism only is measured it becomes a center-preference light measuring. That is the light measuring distribution in an object scene may be made variable by selecting the luminous flux pointed to a light receiving means.

Therefore, a shutter means is provided at least one of the optical paths in an apparatus of the present invention and said selection of luminous flux is made by the shutter.

Thus, an object of the present invention is to provide a light measuring apparatus of a single lens reflex camera having only one light receiving means wherein the light measurement distribution is an object scene is variable.

DESCRIPTION OF THE PREFERRED EMBODIMENTS

Figure 1:
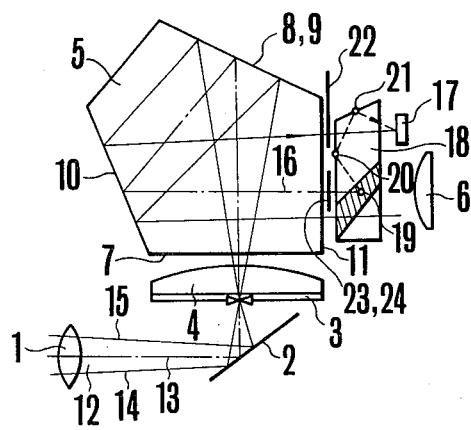
FIG. 1 shows an outline of a light measuring apparatus of the present invention as viewed from its side.
Figure 2:
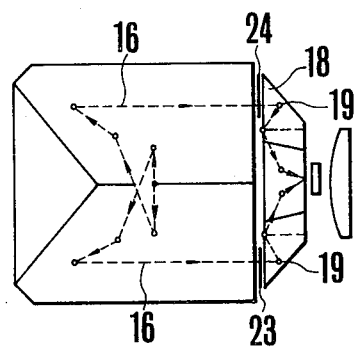
FIG. 2 shows an outline of the apparatus fo FIG. 1 as viewed from above.
Figure 3:
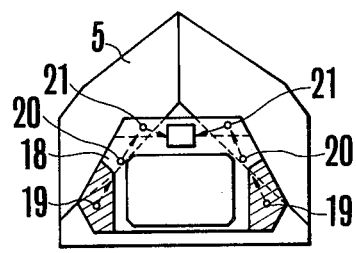
FIG. 3 shows an outline of the apparatus of FIG. 1 as viewed from a direction of its eye-piece.

FIG. 1 to FIG. 3 are drawings to show an example of the present invention, wherein FIG. 1 is a side elevation, FIG. 2 is a plan and FIG. 3 is an end elevation as viewed from a direction of its eye-piece.

In the drawing, 1 is an objective lens, 2 is a swing up mirror, 3 is a focusing screen, 4 is a condensor lens. 5 is a pentagonal roof prism to direct the light beam from the focusing screen to a direction of an eye-piece 6. This pentagonal roof prism has an incident face 7, roof faces 8, 9, a front reflective plan 10, and an exit face 11.

The luminous flux from the objective lens 1 converges at one point on the focusing screen 3 and again becomes divergent light beam. The light beam 13 near the main light beam out of said luminous flux proceeds toward an eye-piece. And the spherical light beams 14, 15 are exited out of the exit plane 11 of the pentagonal prism 5. And in FIG. 1, the spherical light beam 15 having an inclination within a same plane in the drawing paper with the main light beam 13 is exited out of the upper part of the exit face 11. Also the spherical luminous flux 16 (being overlappedly drawn with the main light beam 13 in FIG. 1) having an inclination to the main light beam 13 within a plane perpendicular to the plane of the drawing paper is exited out of the both left and right ends of the exit face 11. The spherical light beam 15 proceeds toward a light receiving means 17 so provided as facing the upper part of the exit face 11. On the other hand, the spherical light beam 16 is reflected by reflective planes 19, 20, 21 provided on a prism block 18 and proceeds to the light receiving means. While the light beam from the upper part of the exit plane 11 is the one from wide zone of the screen 3 being reflected from the reflective plane within the pentagonal prism, the light beam exited out of the both left and right end parts of the exit face 11 and proceeding toward a light receiving means 17 is the one from narrow zone of the screen 3 being reflected within the pentagonal prism. That is because the light beam from both left and right end parts of the exit face 11 has gone through such aperture as determined by the size of the reflective planes 19, 20, 21.

Therefore, when both of the luminous flux from the upper part of the exit face and the luminous flux from the both left and right end parts are measured it becomes center-preference mean light measuring, and when the luminous flux from the upper part only is measured it becomes mean light measuring, while when the luminous flux from the both left and right end parts only is measured, it becomes center-preference light measuring.

For making such selection of luminous fluxes, shutter means 23, 24 are provided facing the upper part and the both end parts of the exit face 11, respectively. The above mentioned selection is made possible by making the shutter means, for example, with a liquid crystal element plate, and by so arranging the same that in the case of center-preference mean light measuring the three point switch provided outside of a camera is so made that voltage is impressed on all of the liquid crystal element plates 22, 23, 24 to make all of the liquid crystal plates 22, 23, 24 transparent, and in the case of mean light measuring voltage is impressed on the liquid crystal plate 22 only to make the liquid crystal plate 22 only transparent, while in the case of center-preference light measuring voltage is impressed on the liquid crystal plates 23, 24 to make the liquid crystal plates 23, 24 transparent.

Also the above mentioned prism block 18 is of a parallel plane glass block shape and their faces opposing to the light receiving means 17 and the eye-piece 6 are flat. Also the reflective plane 19 faces the both left and right end parts of the exit face of the pentagonal prism respectively, while the reflective plane 21 faces the light receiving means 17 and the reflective plane 20 faces the reflective planes 19, 21, respectively.

What is claimed is:

1. A light measuring apparatus for a single lens reflex camera having an eye-piece and comprising :
   an objective lens,
   a focusing screen on which an imagee is formed by the objective lens,
   a pentagonal roof prism for directing light from the screen toward the eye-piece, said prism having a incident face, two roof faces, a front reflective plane and an exit face, said exit face having an upper part as well as left and right end portions,
   only one light receiving means facing the upper part of the exit face of the prism for receiving a first set of light rays from the upper part of the exit face,
   a reflecting means for directing a second set of light rays from both left and right end portions of the exit face of the prism toward the light receiving means, and
   a shutter means in the optical path of at least one of the sets of light rays .

2. A light measuring apparatus for a single lens reflex camera having an eye-piece, comprising :
   an objective lens,
   a focusing screen on which an image is formed by the objective lens,
   a pentagonal roof prism for directing light toward the eye-piece, said prism having an incident face, two roof faces, a front reflective plane and an exit face, said exit having an upper part as well as left and right end portions,
   a block of parallel plane plate shape positioned between the eye-piece and the exit face of the prism,
   only one light receiving means facing the upper part of the exit face of said prism through said block, and
   said block forming a plurality of reflective planes including a pair of reflective planes facing the both left and right end portions of said prism and a pair of reflective planes facing the light receiving means.

* * * * *